(12) United States Patent
Tsuboe et al.

(10) Patent No.: US 6,305,187 B1
(45) Date of Patent: Oct. 23, 2001

(54) AIR-CONDITIONER, OUTDOOR UNIT AND REFRIGERATION UNIT

(76) Inventors: Hiroaki Tsuboe; Susumu Nakayama; Akira Saruta; Kazumoto Urata, all of c/o Hitachi, Ltd., Intellectual Property Group New Marunouchi Bldg. 5-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 0 days.

(21) Appl. No.: 09/552,585

(22) Filed: Apr. 19, 2000

(30) Foreign Application Priority Data

Feb. 14, 2000 (JP) .................................................. 12-039729

(51) Int. Cl.⁷ ...................................................... F25B 31/00
(52) U.S. Cl. ......................... 62/505; 62/196.3; 62/228.1; 62/510
(58) Field of Search ................................ 62/196.1, 196.2, 62/196.3, 505, 510, 324.6, 228.1, 228.5; 418/55.6

(56) References Cited

U.S. PATENT DOCUMENTS

| | | | |
|---|---|---|---|
| 4,064,420 | * 12/1977 | Yuda et al. | 318/244 A |
| 5,103,652 | * 4/1992 | Mizuno et al. | 62/505 |
| 5,112,201 | * 5/1992 | Tamura et al. | 417/366 |
| 5,277,564 | * 1/1994 | Tamura et al. | 418/55.6 |
| 5,329,788 | * 7/1994 | Caillat et al. | 62/505 |
| 5,469,716 | * 11/1995 | Bass et al. | 62/505 |
| 5,931,650 | * 8/1999 | Yasu et al. | 418/55.3 |
| 5,970,728 | * 10/1999 | Hebert | 62/160 |

* cited by examiner

Primary Examiner—Henry Bennett
Assistant Examiner—Melvin Jones
(74) Attorney, Agent, or Firm—Antonelli, Terry, Stout & Kraus, LLP

(57) ABSTRACT

An air-conditioner, an outdoor unit and an refrigeration device each using a refrigeration cycle which can reduce power consumption so as to be highly efficient, which can be operated by a commercially available power source, and which is highly reliable. An air-conditioner comprises a motor and a refrigeration cycle including a compressor driven by the motor, an outdoor heat-exchanger and an indoor heat-exchanger, the motor being located in a motor chamber within a closed container, and refrigerant gas in the refrigeration cycle flows through the motor chamber, wherein the motor has a core of a rotor in which a cage type conductor and permanent magnets magnetized in bipolar state are embedded, and said motor is driven by a commercially available electric power source.

11 Claims, 5 Drawing Sheets

AIR-CONDITIONER, OUTDOOR UNIT AND REFRIGERATION UNIT

BACKGROUND OF THE INVENTION

The present invention relates to an air-conditioner, an outdoor unit and a refrigeration unit using vapor compression refrigeration cycle, and in particularly, is preferable to those which enable a motor installed in a compressor to be driven by commercially available power source and, by which a wide range from low cost products till high cost products and commonness are progressed and kind expansion is facilitated.

As refrigerant compressors used in air conditioners, outdoor units and refrigeration units using vapor compression refrigeration cycle, a constant speed type compressor which is driven at a substantially constant speed, an inverter type compressor whose rotational speed is controlled have been used, and induction motors incorporating cage type conductors (windings) are often employed since they can be easily driven by an A.C. voltage of a commercial frequency and so forth. Further, it has been known that D.C. motors are often employed having a rotor formed by providing permanent magnets to a rotor core and a rotor formed by providing three-phase windings to a rotor core from a view point of high efficiency, as disclosed in JP-A-5-211796.

Further, as motors for industry, an embedded magnet synchronous motor which can be driven by a commercially available electric power has been proposed, in view of the need of energy saving, and it is disclosed in "The Super Economotor and its Applications" by Hirano et al, in Yasukawa Technical Bulletin Vol. 62 NO. 4, 1998, Series Volume No. 241.

In the above-mentioned prior art, the motor disclosed in JP-A-5-211796 is advantageous in view of its high efficiency, but in order to start the motor, it is indispensable to use an inverter, as a power source, whose frequency is variable. A power source circuit or the like becomes complicated, and in the case of a system having a refrigeration cycle, it becomes excessively complicated in a certain application, so as to be expensive.

Further, in order to use the embedded magnet synchronous motor of the above-mentioned prior art, in an air conditioner, an outdoor unit and a refrigeration unit in which refrigeration cycle is used, consideration should be taken to the discharge volume of refrigerant necessary for the refrigeration cycle and the efficiency of the refrigeration cycle also with respect to the rotational speed of the motor, for example, and further, it must avoid that the volume of a compression chamber of the compressor, the size of the overall compressor and the size of the outdoor unit in which the compressor is installed become large.

Further, upon starting the refrigeration cycle, if the differential pressure between the suction side and the discharge side of the compressor is large, there is a possiblity that the start becomes impossible even when the embedded magnet synchronous motor is used or its reliability becomes insufficient.

Further, if overload occurs during steady-state operation of the refrigeration cycle, that is, operation in synchronized condition, a rotor in the embedded magnet synchronous motor greatly stalls, or the temperature of the windings of the motor increases. In the worst case, the material of the windings would be deteriorated or the insulation of the windings would be broken, so that the reliability of the device would remarkably be deteriorated.

In addition, it is required to minimize the affection of the permanent magnets in the embedded magnet synchronous motor to deterioration of the refrigerant and lubrication oil circulating through the refrigeration cycle.

BRIEF SUMMARY OF THE INVENTION

An object of the present invention is to provide an air conditioner, an outdoor unit and a refrigeration unit, using a refrigeration cycle which can reduce power consumption, which is highly efficient, which can be driven by commercially available power source and which is highly reliable.

An another object of the present invention is to decrease the volume of a compression chamber in a compressor, the size of the overall compressor, and sizes an outdoor unit in which the compressor is installed and the refrigeration unit (including an air-conditioner) even though their efficiency is high.

It is noted that the present invention is to achieve at least one of the above-mentioned subject matters and objects.

To achieve the above subject matters, according to the present invention, there is provided an air-conditioner comprising a refrigeration cycle including a compressor driven by a motor, an outdoor heat-exchanger and an indoor heat-exchanger, the motor being located in a motor chamber within a closed-container, and refrigerant gas passing through the motor chamber, the motor including cage conductors and permanent magnets which are magnetized in bipolar condition so that the motor serves as a synchronous motor, provided on a core in a rotor and the motor is driven by a commercially available power source.

With this arrangement, the refrigeration cycle is operated by the commercially available motor, and accordingly, the air-conditioner can be simplified as a system having a refrigeration cycle, and can be used for various applications in a wide range. Further, the permanent magnets embedded in the rotor are magnetized in bipolar state, and therefore, steady-state operation of the refrigeration cycle can be performed at a relatively high speed (3000 r/min, 3600 r/min) even though the commercially available power source has a low frequency of 50 or 60 Hz. Further, the compressor, the outdoor unit, the refrigeration unit and the like can be small-sized and compact, and these become advantages in enhancement of efficiency of the refrigeration cycle and in reduction of noise. In particular, the efficiency of the refrigeration cycle can be further enhanced in view of the following facts in combination: the motor becomes synchronous during steady-state operation and power against slip becomes unnecessary, no variation in the speed of the compressor occurs even though a load is increased due to variation in the outside air temperature, so that the compression efficiency does not lower, and the refrigeration cycle itself can be stable even though load variation occurs to the refrigeration cycle.

Further, a compression mechanism part can be commonly used with variable speed type air-conditioners and the like in which an inverter is used, and expansion of kinds is easily and inexpensive can be achieved.

Further, upon starting, the refrigerant liquid is returned into the compressor by a large quantity to lower the viscosity of lubrication oil, and upon starting for heating operation, the rise-up of the air-conditioner deteriorates. However, because the refrigerant gas is led through the motor chamber and the motor is driven in an asynchronous condition until it is synchronized after it is started by a commercially available power source, heat generated by the motor heats the refrigerant and the lubrication oil, so that it is possible to prevent bearings in the compressor from being damaged to enhance the heating capability.

Further, according to the present invention, there is provided an air-conditioner comprising a refrigeration cycle including a compressor driven by a motor, an outdoor heat exchanger and an indoor heat-exchanger, the motor for driving the compressor in combination of an induction motor and a synchronous motor, the induction motor comprising conductors adapted to heat refrigerant or lubrication oil in the refrigeration cycle, wherein during heating operation, the motor is operated as the induction motor to start the refrigeration cycle, and thereafter the motor is operated as the synchronous motor.

With this arrangement, at least during heating operation, the refrigeration cycle is started by the motor used as the induction motor, and therefore, heat generated by the motor heats the refrigerant and the lubrication oil to prevent the lowering of viscosity thereof, and accordingly, it is possible to prevent bearings in the compressor from being damaged, and to enhance the heating capacity. Nevertheless, thereafter the motor is turned into a synchronized condition in which the speed of the compressor is not changed, so that it is possible to prevent the compression efficiency from lowering even though the load becomes larger due to variation in the temperature of the outside air.

Further, in the above-described air conditioner, it is preferable to provide a circuit bypassing the discharge side and the suction side of the compressor and a shut-off valve for opening and closing this circuit to stard the refrigeration cycle after the shut-off valve is opened.

Further, in the above-described air conditioner, it is preferable to provide a circuit bypassing the discharge side and the suction side of the compressor, a shut-off valve for opening and closing the circuit and a discharge pressure detecting device to open the shut-off valve when a value detected by the discharge pressure detecting device exceeds a set pressure value during operation of the refrigeration cycle.

Further, in the above-described air conditioner, it is desirable to provide a liquid receiver located between the outdoor heat-exchanger and the indoor heat-exchanger, a refrigerant introducing and delivering pipe for introducing the refrigerant into the liquid receiver, a bypass pipe bypassing gas refrigerant in the liquid receiver into the downstream side in view of the flowing direction of the refrigerant, and a shut-off valve incorporated in the bypass pipe to open the shut-off valve when the discharge pressure of the compressor exceeds a set pressure value during operation of refrigeration cycle.

Further, in the above-described air conditioner, it is desirable to use a scroll compressor as the above-mentioned compressor since the inertial force of an orbiting scroll member and the like which are rotary components is small to facilitate the starting thereof and the refrigeration cycle itself can be stabilized even though the load exerted upon the refrigeration cycle varies and noise is reduced.

Further, in the above-described air conditioner, it is desirable to coat outer surfaces of the permanent magnets in view of preventing the refrigerant and the lubrication oil from deteriorating.

Further, according to the present invention, there is provided an air-conditioner comprising a refrigeration cycle including a plurality of compressors driven by a motor an outdoor heat-exchanger and an indoor heat-exchanger, the plurality of compressors comprising a capacity control type variable speed compressor and a constant speed compressor driven by the motor in which cage type conductors and permanent magnets magnetized in bipolar state are provided to a core of a rotor, and a check valve provided on a discharge side of the constant speed compressor.

With this arrangement, even during the variable speed compressor being operated, it is possible to easily start the constant speed compressor by a commercially available electric power by reducing differential pressure between the discharge side pressure and the suction side pressure of the constant speed compressor, and even when the capacity is increased greatly, the range of capacity variation can be increased without correspondingly increasing the inverter power source, and further, fine control can be made.

Further, according to the present invention, there is provided an outdoor unit comprising a compressor driven by a motor and an outdoor heat-exchanger, the motor being accommodated in a motor chamber in a closed container, wherein the compressor comprises a scroll compressor and the motor comprises cage type conductors and permanent magnets magnetized in bipolar state, which are provided in a core of a rotor.

Further, according to the present invention, there is provided a refrigeration unit comprising a compressor driven by a motor, a condenser, a liquid receiver, an expansion valve and an evaporator, the motor being accommodated in a motor chamber in a closed container, wherein the compressor comprises a scroll compressor having a fixed scroll and an orbiting scroll, and the orbiting scroll is driven by the motor in which cage type conductors and permanent magnets are embedded in the core of the rotor.

DETAILED DESCRIPTION OF THE INVENTION

Detailed explanation of an embodiment of the present invention will be made hereinafter with reference to the accompanying drawings.

In order to enhance the efficiency of an air-conditioner using a vapor compression refrigeration cycle, it is effective to enhance the efficiency of a motor used in a refrigerant compressor which consumes a highest power among components constituting the refrigeration cycle. Conventionally, induction motor has often been used for the refrigerant compressor, but it has been well-known that a synchronous motor in which permanent magnets are embedded in a core of a rotor, is high efficient in comparison with the induction motor. Since the synchronous motor is rotated by utilizing attraction between the permanent magnets embedded in the rotor of the motor and rotational magnetic field induced from a stator, no secondary current which is generated in the induction motor is generated in the rotor of the motor, and accordingly, no energy loss is present, so that it is possible to enhance the efficiency.

However, in the case of using the synchronous motor as a motor of the refrigerant compressor, the following facts should be taken into consideration:

When a synchronous motor used as a motor of a refrigerant compressor is connected directly to a commercially available power source, a rotational magnetic field generated by a stator of the motor has a rotational speed corresponding to a power source frequency (50/60 Hz). The rotor of the motor used for the refrigerant compressor has a large inertial force since it is integrally incorporated with rotary components in the refrigerant compressor. Accordingly, upon starting, the rotor cannot follow the rotational speed of the rotational magnetic field generated by the stator, so that the refrigeration cycle cannot be started. Thus, in the case of requiring a constant speed compressor, the synchronous motor cannot be used since it is in generally considered that the use of the commercially available power source is desirable.

Figure 1:
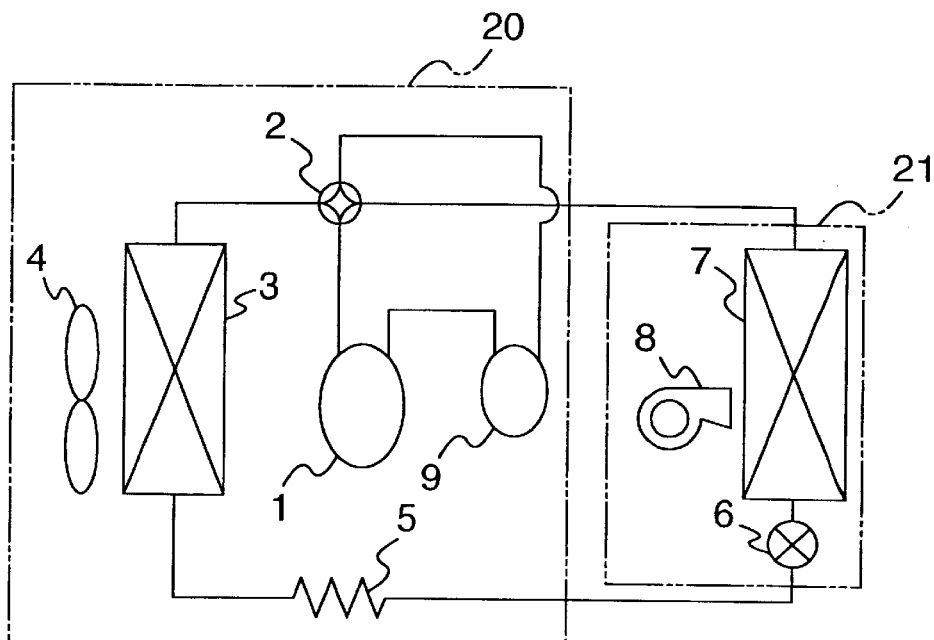
FIG. 1 a system diagram of a refrigeration cycle according to an embodiment of the present invention.
Figure 2:
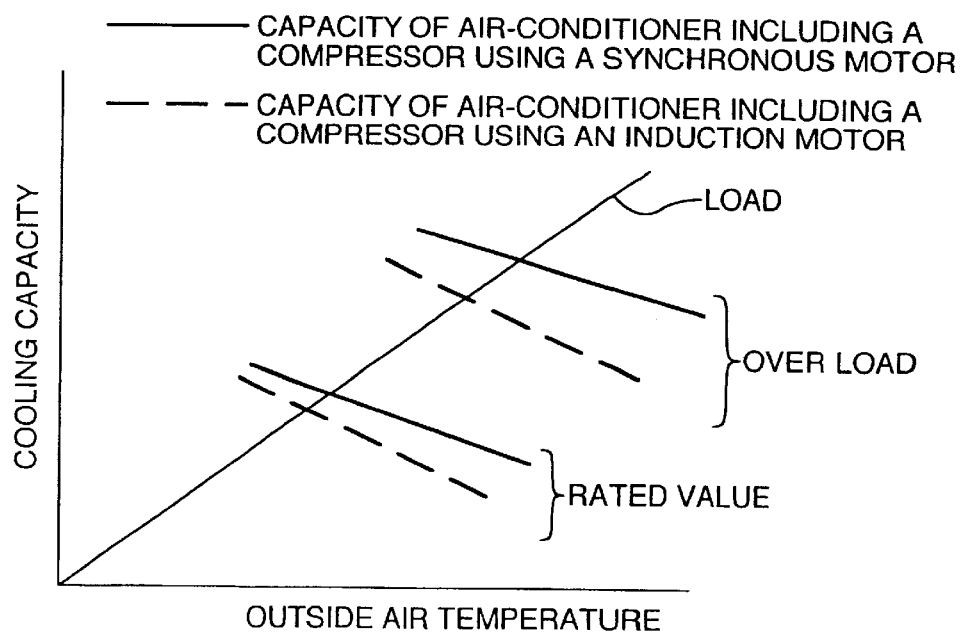
FIG. 2 is a graph showing relationship between cooling capacity and outside air temperature of an air conditioner according to the embodiment of the invention.

Referring to FIGS. 1 and 2 which show an air-conditioner in an embodiment of the present invention, a constant speed compressor driven by a commercially available power source is used, and it comprises a synchronous motor which serves as an induction motor when a rotor core in the motor for driving the compressor is rotated at a speed below a synchronous speed, that is, bipolar permanent magnets are embedded in the rotor core.

The air-conditioner shown in FIG. 1, comprises a constant speed compressor 1, a four-way valve 2, an outdoor heat-exchanger 3, an outdoor expansion device 5, an indoor expansion device 6, an indoor heat-exchanger 7, and an accumulator 9, which are connected successively. In the constant speed compressor 1, cage type windings (conductors) are formed along a periphery of the rotor in the vicinity of a circumference of the rotor, and permanent magnets are embedded in the rotor. With this arrangement, the motor serves an induction motor until the speed of the rotor reaches a synchronous speed, and it serves as a synchronous motor when the speed of the rotor becomes a synchronous speed. Accordingly, the starting can be made even when an inverter is not used, and during operation at the synchronous speed, that is, during steady-state operation at a speed (3,000 r/min, 3,600 r/min) which is determined by a power source frequency (50 Hz or 60 Hz) of the commercially available power source, no secondary current is generated in the rotor of the motor, so that it is possible to enhance the efficiency.

Although the motor in which the permanent magnets are embedded in the rotor of the motor is used for the constant speed compressor 1, it is possible to use such an arrangement that a mere permanent magnet type synchronous motor and an induction motor which can be driven at a speed around the synchronous speed are combined. In this case, power is fed only to the induction motor upon starting, and when the speed of the induction motor reaches a speed around the speed of the synchronous motor, the supply of power to the induction motor is cut off and simultaneously, power is fed to the synchronous motor. With this arrangement, the compressor 1 is driven by only the synchronous motor through steady-state operation. Accordingly, the operation efficiency of the motor and the compressor 1 becomes high, so that also the efficiency of the air-conditioner as a whole is enhanced.

That is, the synchronous motor does never cause occurrence of slippage between the stator and the rotor, which would possible occur in an induction motor, and accordingly, variation in the speed of the rotor due to load variation is small in comparison with the induction motor and the rotational speed of the rotor becomes higher under the same load. Therefore, a volume of the refrigerant which is compressed by refrigerant compressing mechanism in the compressor 1 is increased and the discharge volume of the refrigerant from the compressor 1 is increased, so that it is possible to enhance the capability of the refrigeration cycle in a normal load range, as shown in FIG. 2.

In particular, also during such operation that the refrigeration cycle becomes overloading, no slip occurs in the synchronized condition, and accordingly, since no current runs through the cage conductors, such an effect that the capability is enhanced becomes very high in comparison with such a fact that the induction motor causes a large slip in an overload condition. Further, if a scroll compressor is used for the compressor 1, variation in the compression torque is small, and accordingly, load variation for the motor is small, so that efficiency can be further enhanced. It is noted that FIG. 2 shows the result obtained through cooling operation, but the same result can also be obtained through heating operation.

Further, the speed of the rotor in the motor is inversely proportional to the number of poles of the motor, and accordingly, the speed of the rotor in the motor can be increased by setting the number of poles to the minimum two. Thus, the discharge volume of the refrigerant from the compressor 1 can be increased. Accordingly, the volume of the compression chamber in the compressor 1 can be decreased, and as a result, it is possible to reduce the size of the compressor 1 and as well the size of the outdoor unit 20 in which the compressor is installed. Further, a compressing mechanism part and other components which are necessary for the refrigeration cycle can be commonly used for various air-conditioners including an variable speed type air conditioner using an inverter, and expansion of kinds of air-conditioners is easy and it is possible to manufacture the air-conditioners inexpensively.

Figure 6:
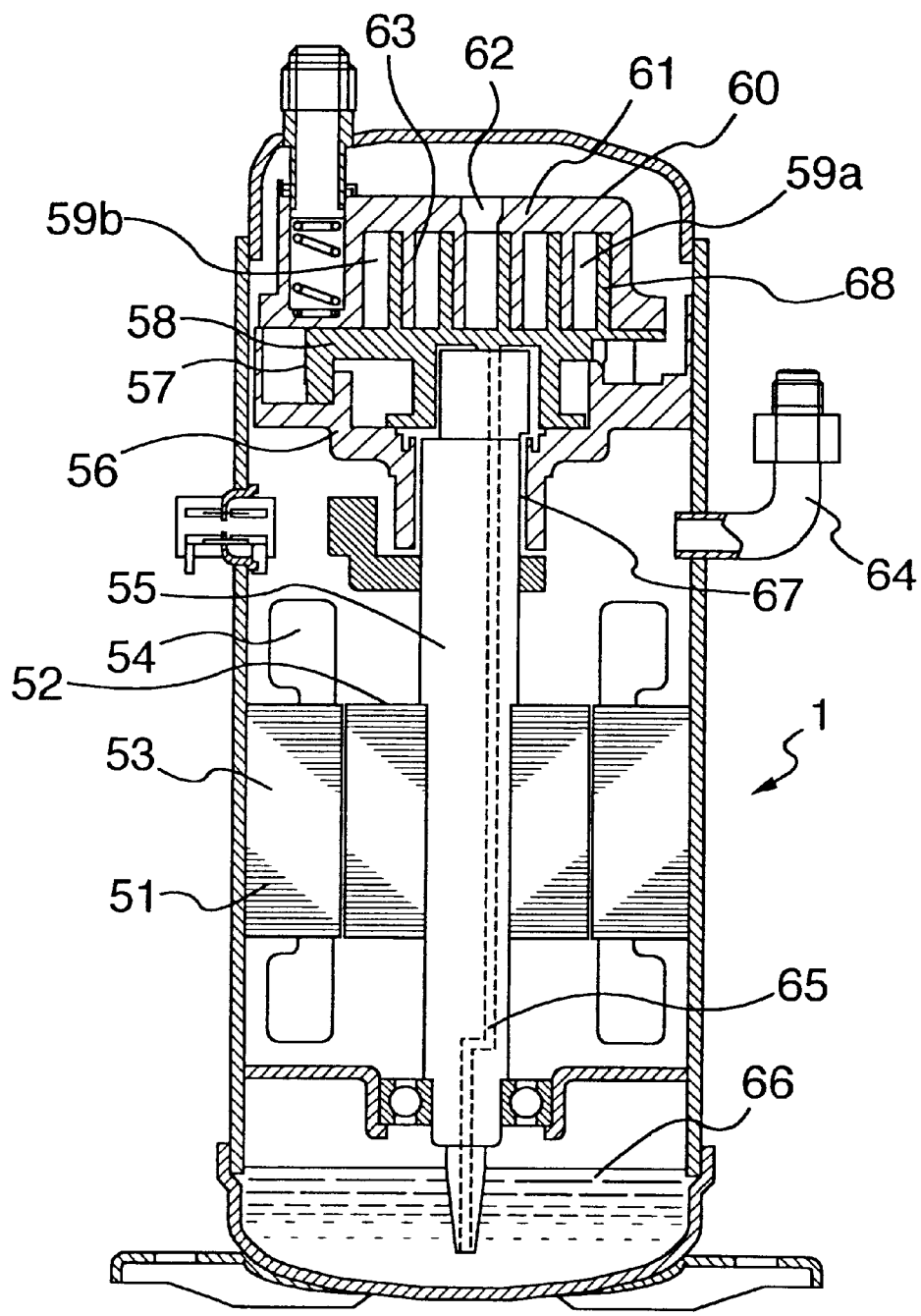
FIG. 6 is a sectional view of a compressor according to one embodiment of the invention.
Figure 7:
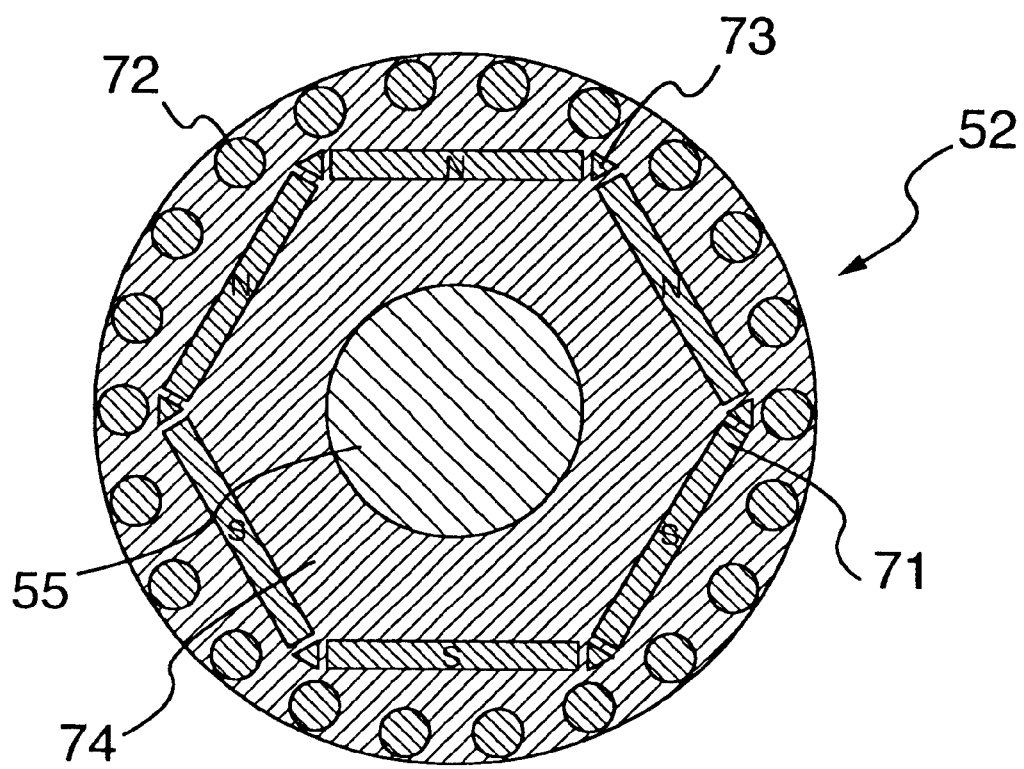
FIG. 7 is a sectional view of a rotor of a motor according to one embodiment of the invention.

Explanation will be made of the compressor 1 and the rotor 5 with reference to FIGS. 6 and 7.

The compressing mechanism part comprises a spiral wrap 63 stood on an end plate 61 of a fixed scroll 60 and a spiral wrap 68 stood on an end plate 58 of an orbiting scroll 57, which are meshed with each other. The orbiting scroll 57 is turned by a crankshaft 55 so as to effect compressing operation.

Among compression chambers 59 (59a, 59b . . . ) defined between the fixed scroll 60 and the orbiting scroll 57, compression chambers which are located outermost in radial direction, are displaced toward centers of both scrolls, and accordingly, the volumes thereof are gradually decreased. When both compression chambers 59a, 59b come to positions in the vicinity of the centers of both scrolls 60, 57, refrigerant gas which is compressed in both compression chambers is discharged through a discharge port 62 which is communicated with the compression chambers. The discharged refrigerant gas is led through a gas passage formed in the fixed scroll 60 and a frame 56 and into a compression container below the frame 56, and is then discharged outside of the compressor through a discharge pipe 64 provided to a side-wall of the compression container.

Further, the motor is enclosed in the compression container (motor chamber), and the orbiting scroll 57 is driven by the motor so as to carry out compressing operation.

An oil sump part 66 is provided below the motor, and lubrication oil in the sump part is led through an oil passage 65 formed in the crankshaft 55 due to pressure differential caused by rotary motion so as to lubricate sliding parts of the orbiting scroll 57, the crankshaft 55, slide bearings and the like.

The motor is an embedded magnet type synchronous motor comprising a stator 51 and a rotor 52. The stator 51 comprises a stator core 53 and stator windings (conductors) 54 wound on the stator core 53. The rotor 52 comprises a rotor core 74 in which permanent magnets 71 are embedded and which has slits 3 between the magnets. The permanent magnets 71 are magnetized in bipolar state, and the conductors are embedded in the vicinity of a circumference of the rotor 52 so as to form cage conductors (windings) 72.

Figure 3:
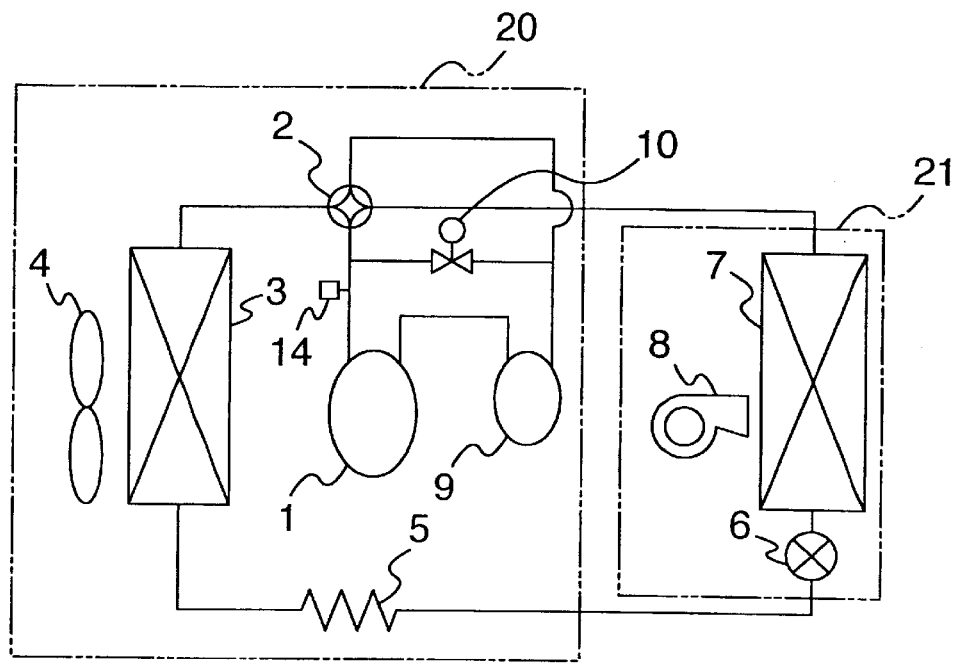
FIG. 3 is a system diagram of a refrigeration cycle according to another embodiment of the present invention.

Next, explanation will be made of another embodiment with reference to FIG. 3.

In the case of starting the refrigeration cycle, the starting cannot be made if the differential pressure between the discharge side and the suction side of the compressor 1 is large, resulting in lowering of the reliability thereof, and accordingly, it is required to ensure sufficient starting torque. Therefore, even when the refrigeration cycle is started by the induction motor and thereafter, is operated by the synchronous motor, the action effected by the induction motor, that is, the volume of the case type conductors of the rotor should be increased or the diameter of the conductors should be increased so as to increase the current running therethrough, in order to increase the starting torque. Accordingly, there is a fear that the compressor 1 becomes large-sized. Further, should the compressor be made to be compact, the permanent magnets could hardly been embedded in the rotor core in view of its structure. Further, several minutes have passed after the compressor 1 is stopped till balance the pressure in the refrigeration cycle balances.

Accordingly, the discharge side and the suction side of the compressor are connected together through a bypass pipe, and a shut-off valve 10 for opening and closing the bypass passage thereof is provided. With this arrangement, by opening the shut-off valve 10 before starting, the differential pressure between the discharge pressure and the suction pressure can be decreased, and accordingly, the compressor 1 can be easily started. Further, the volume of the cage type conductor can be decreased, and therefore, the permanent magnets can be easily incorporated in the rotor 52, so that it is possible to suitably make the compressor compact, and to ensure the reliability.

Further, during operation of the compressor 1, when a torque exerted to the rotor 52 of the motor becomes larger, that is, when the discharge pressure becomes higher, there would be caused such a risk that the rotor of the motor stalls. Therefore, a value Pdset of discharge pressure with which the rotor 52 of the motor is prevented from stalling, is set, and a discharge pressure is measured by a discharge pressure detecting device 14. When the discharge pressure is increased up to the value Pdset, the shut-off valve 10 is opened to lower the discharge pressure, so that it is possible to prevent the refrigeration cycle from being abnormal due to stall of the motor. Further, if a scroll compressor is used as the compressor, variation in torque of the scroll compressor is less, and accordingly, it: is possible to effectively prevent the refrigeration cycle from being abnormal so as to enhance the reliability and to achieve noise reduction.

A pressure switch which is set so that a switch in an electric circuit is opened (or closed) when the discharge pressure comes up to the set pressure Pdset may be used as the pressure detecting device 14.

Figure 4:
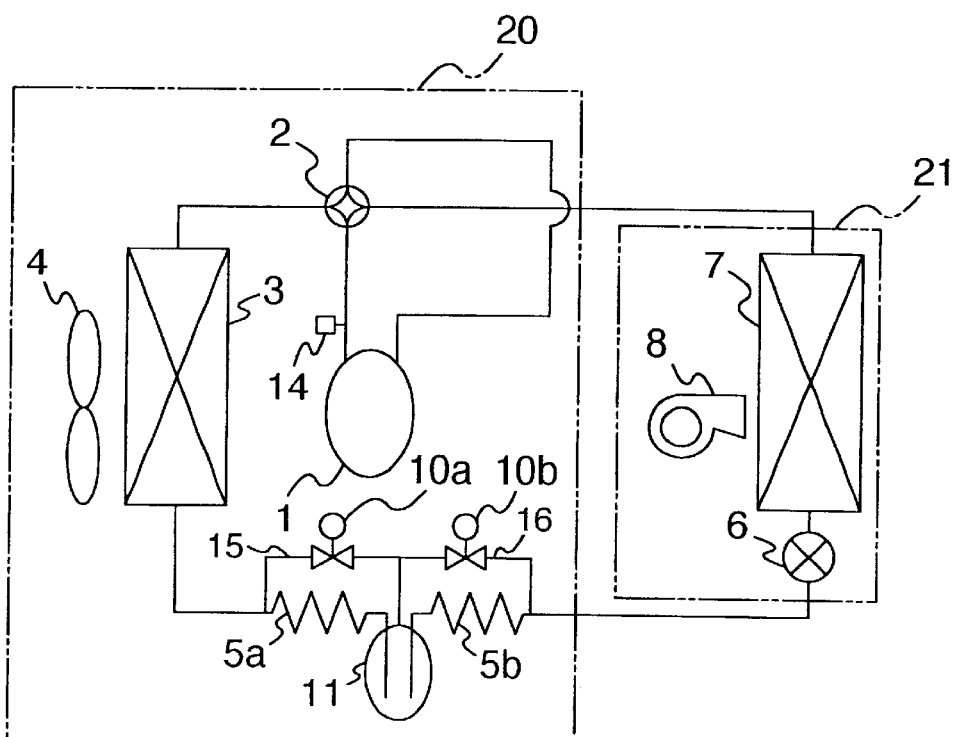
FIG. 4 is a system diagram of a refrigeration cycle according to still another embodiment of the present invention.

Next, explanation will be made of further another embodiment of the present invention with reference to FIG. 4. The air-conditioner includes a liquid receiver 11 between the outdoor heat-exchanger 3 and the indoor heat-exchanger 7 (between the outdoor heat-exchanger 3 and the indoor expansion device 6), a refrigerant introducing pipe 15 for introducing the refrigerant into the liquid receiver 11, a bypass pipe 16 for bypassing gas refrigerant from the liquid receiver 11 into a downstream side of the main pipe line in the flowing direction, a first shut-off valve 10a for opening and closing the refrigerant introducing pipe 15 and a second shut-off valve 10b for opening and closing the bypass pipe 16.

During cooling operation, the shut-off valve 10b is opened. The gas refrigerant in the liquid receiver 11 can be discharged. The dryness of the refrigerant at the inlet and outlet of the liquid receiver 11 becomes higher, so that the dryness of the refrigerant at the outlet of the outdoor heat-exchanger 3 serving as a condenser becomes higher. Accordingly, the outdoor heat-exchanger 3 can be effectively used as a condenser to restrain the condensing pressure to a lower value, so that it is possible to lower the discharge pressure. During heating operation, the shut-off valve 10a is opened so as to obtain an effect similar to that obtained during the cooling operation.

With the use of the above-mentioned arrangement, a discharge pressure Pdset with which the rotor 52 of the motor used for the compressor 1 does not stall is set, and a discharge pressure is detected by the discharge pressure detecting device 14. When the discharge pressure comes up to the set discharge pressure Pdset, the shut-off valve 10b is opened during cooling operation or the shut-off valve 10a is opened during heating operation. Accordingly, the discharge pressure can be lowered, so that it is possible to prevent the refrigeration cycle from being abnormal.

Figure 5:
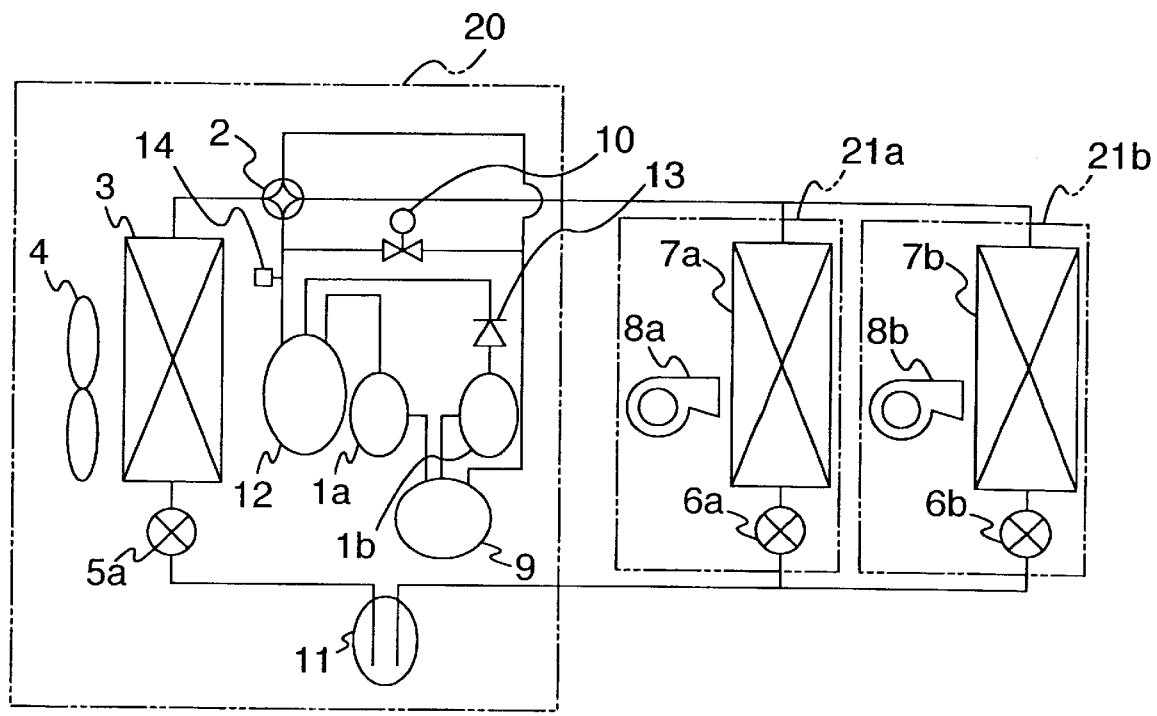
FIG. 5 is a system diagram of a refrigeration cycle according to other embodiment of the present invention.

Explanation will be made of further another embodiment with reference to FIG. 5.

A single variable speed compressor 1a and more than one of constant speed compressors 1b which are driven by a commercially available electric power source are installed for the compressor 1, and a check valve 13 is provided on the discharge side of the constant speed compressors 1b.

A plurality of indoor units 21a, 21b are provided, and accordingly, the load is greatly changed in accordance with use condition of the indoor units 21a, 21b. When the load on the indoor unit side is small, it is not required to drive all the compressors 1a, 1b, and accordingly, only the variable speed compressor 1a is driven to carry out capacity control operation. When only the variable speed compressor 1a is driven, if the load on the indoor unit side becomes large, so that the capacity cannot be ensured only by the variable speed compressor 1a, the constant speed compressors 1b are driven. At this stage, since the variable speed motor 1a has been already operated, the differential pressure between the discharge side pressure and the suction side pressure is large for the constant speed compressors 1b. However, since the check valve 13 is provided on the discharge side of the constant speed compressors 1b, the differential pressure between the discharge side pressure and the suction side pressure of the constant speed compressors 1b is decreased even during the operation of the variable speed compressor 1a. Accordingly, it is possible to facilitate the starting with the use of a commercially available electric power source. Thus, even when a large capacity is demanded as in the case of a multiple air-conditioner unit, it is possible carry out fine control over a wide capacity variation range without additional provision of an inverter power source.

In the above-mentioned arrangement, for the compressor 1, if magnets made of neodymium, iron, boron or samarium-cobalt are used as the magnets which are embedded in the core in the rotor 52 of the motor, the size of the permanent magnets can be decreased, and the number of them can also be decreased. Thus, the provision of the cage type conductors and the permanent magnets in the core of the rotor 52 can be facilitated in view of its structure, and accordingly, the compressor 1 can be small-sized. Further, since the efficiency can be enhanced, the size of the outdoor unit 20 in which the compressor 1 is installed can be decreased.

Further, when magnets made of neodymium, iron, boron or samarium-cobalt are used, the rare earth elements such as neodymium or samarium which are the materials of the permanent magnets serves as strong catalyst to deteriorate lubrication oil, resulting in that deterioration products are deposited as sludge in the refrigeration cycle when the magnets come into contact with the refrigerant and the lubrication oil. Consequently, capillalry is blocked to hinder the flow of the refrigerant, resulting in abnormal rise of the temperature of the refrigerant compressor.

However, by coating the outer surfaces of the permanent magnets with coating, nickel plating or aluminum plating, the permanent magnets can be prevented from coming into-direct contact with the refrigerant and the lubrication oil in the compressor 1, so that the deterioration of the lubrication oil can be restrained and it is possible to enhance the reliability.

Further, in the above-mentioned embodiments, it has been considered that the constant speed compressors driven by a commercially available electric power source are used. However, if the embedded magnet type synchronous motor as shown in FIG. 7 is driven by using an inverter power source which can change its frequency, it is possible to aim at further enhancing the performance.

In particular, in the case of a refrigerating device for an exhibition casing or the like, it is preferable to use a scroll compressor of a liquid injection type in order to stabilize the refrigeration cycle and to enhance the reliability. Further, the opening degree of an electronic expansion valve provided in a liquid ejection pipe line is controlled in accordance with a temperature on the discharge side of the compressor so as to regulate the volume of liquid injection, and accordingly, the compressor can be prevented from overheating, so that it is possible to carry out the operation with a wide capability at an evaporation temperature.

Further, it is preferable that the maximum capacity of the refrigeration device is set to be larger than a pre-assumed load, that is, a number of exhibition casings and by using the inverter power source, capacity is controlled in order to have a margin. With this, even though the load, that is, the number of exhibition casings is increased, exceeding the presumed value, it is possible to cope therewith only by increasing the capacity of the refrigeration device without replacement of a compressor with the one having a larger capacity. Even though non chlorinated refrigerant such as HFC group refrigerant which does not destroy the ozone layer is used, instead of HCFC22 which have been widely used as the refrigerant, it is possible to ensure high performance and reliability for the air-conditioner.

As described above, there can be provided an air-conditioner, an outdoor unit and a refrigeration device using a refrigeration cycle, according to the present invention, which can reduce the power consumption, and enhance the efficiency, which can be driven by a commercially available electric power source, and which are highly reliable. Further, even with such high efficiency, it is possible to aim at reducing the volume of a compression chamber in a compressor, the overall size of the compressor, and the sizes of an outdoor unit and a refrigeration device in which the compressor is installed.

We claim:

1. An air-conditioner comprising a motor and a refrigeration cycle including a compressor driven by said motor, an outdoor heat-exchanger and an indoor heat-exchanger, said motor being located in a motor chamber within a closed container, and refrigerant gas in the refrigeration cycle flows through the motor chamber, wherein said motor has a core of a rotor in which a cage type conductor and permanent magnets magnetized in bipolar state are embedded so as to serve as a synchronous motor, and said motor is driven by a commercially available electric power source.

2. An air-conditioner according to claim 1, further comprising a circuit for bypassing the discharge side and the suction side of said compressor and a shut-off valve for opening and closing said circuit, wherein said refrigeration cycle is started after said shut-off valve is opened.

3. An air-conditioner according to claim 1, further comprising a circuit for bypassing the discharge side and the suction side of said compressor, a shut-off valve for opening and closing said bypass circuit, and a discharge pressure detecting device, wherein said shut-off valve is opened when a value detected by said discharge pressure detecting device exceeds a set pressure value during operation of the refrigeration cycle.

4. An air-conditioner according to claim 1, further comprising a liquid receiver between said outdoor heat-exchanger and said indoor heat-exchanger, a refrigerant introducing pipe for introducing refrigerant into said liquid receiver, a bypass pipe for bypassing the refrigerant gas from said liquid receiver into the downstream side in view of the direction of the flowing direction of the refrigerant, and a shut-off valve located in said bypass pipe, wherein said shut-off valve is opened when a discharge pressure of said compressor exceeds a set pressure value during operation of said refrigeration cycle.

5. An air-conditioner according to claim 1, wherein said compressor comprises a scroll compressor.

6. An air-conditioner according to claim 1, wherein said permanent magnet is coated.

7. An air-conditioner comprising a motor and a refrigeration cycle including a compressor driven by said motor, an outdoor heat-exchanger and an indoor heat-exchanger, said motor functioning as an induction motor and a synchronous motor of which conductor heating refrigerant and lubrication oil in said refrigeration cycle, wherein during heating operation, said motor is operated as said induction motor so as to start said refrigeration cycle, and thereafter, said motor is operated as the synchronous motor.

8. An air-conditioner comprising a plurality of motors, a refrigeration cycle including a plurality of compressors respectively driven by said motors, an outdoor heat-exchanger and an indoor heat-exchanger, said plurality of compressors comprising a variable speed compressor which is controllable in capacity and a constant speed compressor driven by one of said plurality of motor having a core of a rotor in which a cage type conductor and permanent magnets magnetized in bipolar state are embedded, and a check valve located in discharge side of said constant speed compressor.

9. An outdoor unit comprising a motor, a compressor driven by said motor and an outdoor heat-exchanger, said motor being incorporated in a motor chamber within a closed casing and comprising a scroll compressor, said motor having a core of a rotor in which a cage type conductor and permanent magnets magnetized in bipolar state are provided.

10. A refrigeration device comprising a motor, a compressor, a condenser, a liquid receiver, an expansion valve and an evaporator, said motor being incorporated in a motor chamber within a closed container, said compressor comprising a scroll compressor including a fixed scroll and an orbiting scroll, said orbiting scroll being rotated by said motor having a core of a rotor in which a cage type conductor and permanent magnets are embedded.

11. A refrigeration device according to claim 10, wherein said compressor is of a liquid injection type, and the volume of liquid injection and the speed of said compressor are controlled.

* * * * *